No. 655,922.                                    Patented Aug. 14, 1900.
C. E. DURYEA.
SPEED GOVERNOR.
(Application filed Nov. 6, 1899.)
(No Model.)
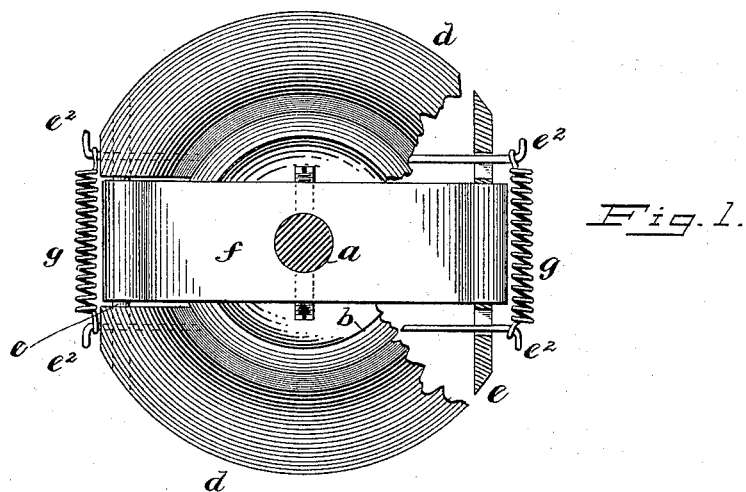
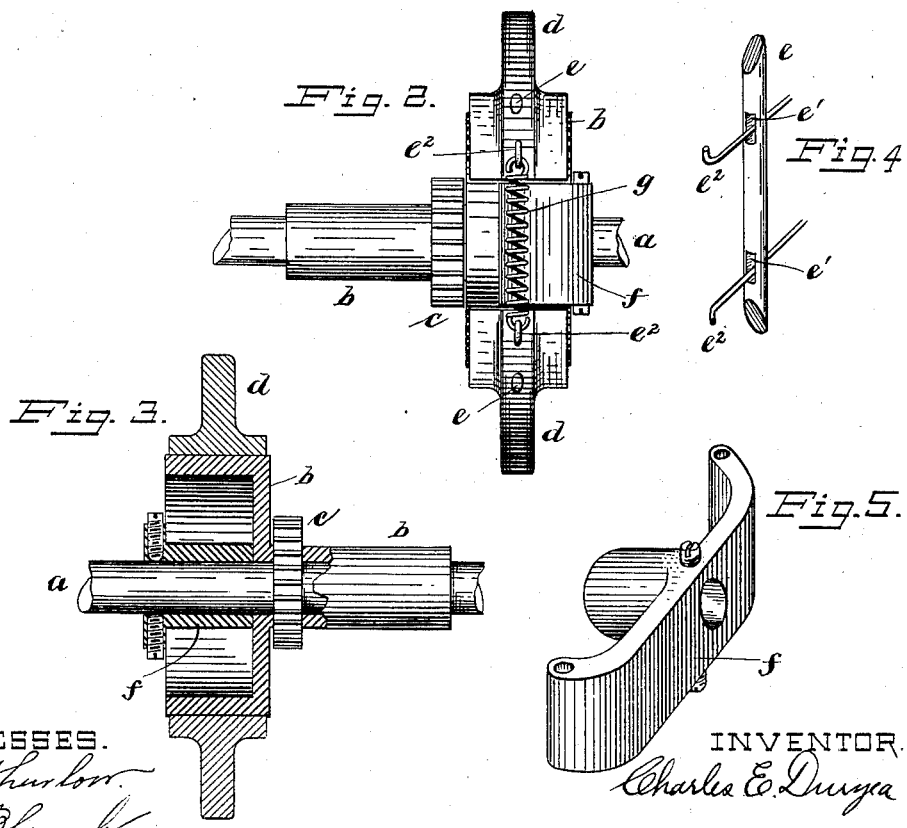
WITNESSES.
L. M. Thurlow
J. H. Blasch
INVENTOR.
Charles E. Duryea

UNITED STATES PATENT OFFICE.

CHARLES E. DURYEA, OF PEORIA, ILLINOIS.

SPEED-GOVERNOR.

SPECIFICATION forming part of Letters Patent No. 655,922, dated August 14, 1900.

Application filed November 6, 1899. Serial No. 736,004. (No model.)

*To all whom it may concern:*

Be it known that I, CHARLES E. DURYEA, a citizen of the United States, residing at Peoria, in the county of Peoria and State of Illinois, have invented certain new and useful Improvements in Speed-Governors; and I do hereby declare the following to be a full, clear, and exact description of the invention, such as will enable others skilled in the art to which it appertains to make and use the same.

My invention relates to devices for maintaining a constant speed of an electric generator, more particularly as applied to ignition of the charges of internal-combustion engines used for motor-vehicle service.

The objects of my invention are to permit a wide range of speeds of the driving-motor while securing sufficient speed of the generator to get a serviceable spark under all conditions and yet preventing that speed from becoming excessive and doing damage to the generator by overheating its bearings, coils, or other parts.

A further object is to secure reliable action of the driving-motor.

I secure these and other minor objects by the mechanism shown in the accompanying drawings, in which—

Figure 1 is an end elevation of the governor. Fig. 2 is a plan. Fig. 3 is a section through the various parts. Fig. 4 is a detail of the slotted guide-pins which control the centrifugal weights. Fig. 5 is a perspective of frame affixed to generator-shaft which carries centrifugal weights.

Similar letters refer to similar parts throughout the several views.

The shaft $a$ is an extension of the armature-shaft or of that shaft upon which the moving parts of the generator revolve, and as this generator may be of any form and is most commonly that of an ordinary dynamo its bearings and the dynamo are not shown. Loosely journaled upon this shaft is a pulley $b$, having long bearing on the shaft $a$, so as to properly give service under high speeds. A gear $c$ or any suitable mechanical driving device affixed to the pulley $b$ derives motion directly from the fly-wheel or other suitable part of the driving-motor. Being directly connected, this gear $c$ and the loose pulley $b$ will run at speeds proportional to the driving-motor. Bearing upon the pulley $b$ and more or less surrounding same are weights $d\,d$, having friction-surfaces concentric with and adapted to contact against surfaces on the loose pulley $b$. These weights $d\,d$ are provided with parallel guide-pins $e\,e$, fixed in the weight-frame $f$. The guide-pins $e\,e$ are perforated with slots at $e'$, in which the retaining-pins $e^2$ are engaged. These retaining-pins enter and are firmly fixed in the weights $d\,d$. Springs $g\,g$ draw the weights $d\,d$ together in opposition to the centrifugal force, and while these may be attached to the weights in any suitable manner I prefer to have them engage hooked ends of the retaining-pins $e^2\,e^2$. The weights $d\,d$ are preferably of such shape as to have wide friction-surface and one or more ridge-like projections extending well out from the friction-surface and serving to radiate the heat generated by friction. The loose pulley $b$ is likewise preferably constructed to radiate heat and has the pulley portion hollowed with the journal-bearing on the shaft at one side of the pulley portion. The weight-frame $f$ is affixed to the shaft to be revolved by set-screws or any suitable method, such as cotter-pins or keys.

The operation is as follows: When the driving-motor revolves the loose pulley $b$, the weights $d\,d$ by friction are driven. These transmit power through the guide-pins $e\,e$ and fixed frame $f$ to the shaft $a$, making this shaft $a$ revolve until such speed is reached that the centrifugal force acting on the weights $d\,d$ overcomes to a greater or less extent the strength of the springs $g\,g$ and lifts the weights away from the loose pulley $b$. When such lifting occurs, the shaft $a$, no longer receiving power, slows down, permitting the springs to bring the weights $d\,d$ into contact again, resulting in a balance between the springs and the centrifugal force, which causes the weights to constantly slip and only to receive sufficient power to drive the shaft $a$ at the required speed. This constant slipping under more or less spring tension heats the parts by friction unavoidably, and on this account the weights are ridged, as before stated and explained.

The slots $e'$ in Figs. 1 and 4 are provided for and perform a valuable service, in that they do not permit much freedom of motion to the weights $d\ d$; but they allow the friction-surfaces to wear off quite considerably and the weights $d\ d$ to approach each other as the wearing of the surfaces may require. The object of this arrangement is to prevent one weight from throwing off farther than the other and greatly increasing its centrifugal tendency, because in such a case it might draw the other weight against the loose pulley with sufficient power to drive the shaft unduly fast and interfere with the action of the governor. Further, if either weight should move a much greater distance outward than the other the balance of the parts would be destroyed and injurious vibration caused. These slots $e'$ perform a still further service, in that they prevent the weights from escaping in case a spring should break.

Modifications in detail may be resorted to without departing from the spirit of the invention or sacrificing any of its advantages.

I claim—

1. In a speed-governor, the combination with the revoluble shaft and weights each having a heat-radiating flange, and guide-pins with slots, of the retaining-pins movable in said slots and yieldingly connected as set forth.

2. The combination with the shaft and the loose pulley thereon, of the weights embracing said pulley, the parallel guide-pins in said weights, the retaining-pins at right angles to the guide-pins and fixed in the weights and movable in slots in the guide-pins, and a weight-frame affixed to the main shaft and a gear fixed to the loose pulley, substantially as and for the purpose specified.

3. In combination with the revolving shaft of an electric generator, a loose driven pulley journaled on said shaft, a frame fixed to said shaft, weights carried by said frame on parallel guides: springs connecting said weights and retaining-pins engaging slots adapted to limit the motion of said weights.

4. The combination with the shaft and the loose pulley thereon, of the weights having frictional surfaces concentric with and adapted to contact with opposite sides of the said pulley, parallel guide-pins in the weights, retaining-pins in the weights at right angles to the guide-pins and working therein, with hooked ends, a weight-frame and springs connecting the hooked ends of said pins, as set forth.

In testimony whereof I affix my signature in presence of two witnesses.

CHARLES E. DURYEA.

Witnesses:
E. H. BOND,
EDWIN S. CLARKSON.